United States Patent
Zhong (10) Patent No.: US 11,755,042 B2
(45) Date of Patent: Sep. 12, 2023

(54) AUTONOMOUS ORBITING METHOD AND DEVICE AND UAV

(71) Applicant: AUTEL ROBOTICS CO., LTD., Guangdong (CN)

(72) Inventor: Ziming Zhong, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 102 days.

(21) Appl. No.: 17/455,744

(22) Filed: Nov. 19, 2021

(65) Prior Publication Data
US 2022/0075394 A1    Mar. 10, 2022

Related U.S. Application Data

(63) Continuation of application No. PCT/CN2020/091620, filed on May 21, 2020.

(30) Foreign Application Priority Data

May 22, 2019    (CN) .......................... 201910430492.0

(51) Int. Cl.
*G05D 1/12*    (2006.01)
*B64C 39/02*    (2023.01)
(Continued)

(52) U.S. Cl.
CPC ............. *G05D 1/12* (2013.01); *B64C 39/024* (2013.01); *B64D 47/08* (2013.01); *G05D 1/0094* (2013.01);
(Continued)

(58) Field of Classification Search
CPC ....................................................... G05D 1/12
See application file for complete search history.

(56) References Cited

U.S. PATENT DOCUMENTS 10,866,597 B1 *    12/2020    Reinhold .............. B64C 39/022
10,956,712 B1 *    3/2021    Picardo .................. G06V 20/17
(Continued)

FOREIGN PATENT DOCUMENTS

CN    103149939 A    6/2013
CN    105787447 A    7/2016
(Continued)

OTHER PUBLICATIONS

The International Search Report dated Jul. 31, 2020; PCT/CN2020/091620.

*Primary Examiner* — Shelley Chen (57) ABSTRACT

Embodiments of the disclosure relate to the field of unmanned aerial vehicle (UAV) technologies, and specifically disclose an autonomous orbiting method and device and a UAV. The UAV includes a binocular camera assembly. The method includes: obtaining, through the binocular camera assembly, a target footage and an orbited object selected by a user from the target footage; obtaining a flying height of the UAV when obtaining the target footage; determining a spatial distance between the binocular camera assembly and the orbited object based on the target footage; detecting an optical axis direction of the binocular camera assembly in real time; and performing autonomous orbiting according to the flying height, the spatial distance and the optical axis direction of the binocular camera assembly detected in real time.

14 Claims, 4 Drawing Sheets

(51) Int. Cl.
*B64D 47/08* (2006.01)
*G05D 1/00* (2006.01)
*G05D 1/10* (2006.01)
*B64U 101/30* (2023.01)

(52) U.S. Cl.
CPC ......... *G05D 1/101* (2013.01); *B64U 2101/30* (2023.01); *B64U 2201/10* (2023.01)

(56) References Cited

U.S. PATENT DOCUMENTS

| | | | |
|---|---|---|---|
| 10,990,801 B1 * | 4/2021 | Picardo | G06V 20/38 |
| 2012/0229914 A1 * | 9/2012 | Cook | G02B 13/14 |
| | | | 359/689 |
| 2015/0041595 A1 * | 2/2015 | Hartmann | B64G 1/36 |
| | | | 244/158.8 |
| 2016/0173859 A1 | 6/2016 | Choi et al. | |
| 2017/0369167 A1 | 12/2017 | Meadow | |

FOREIGN PATENT DOCUMENTS

| | | | | |
|---|---|---|---|---|
| CN | 106657779 A | | 5/2017 | |
| CN | 106909172 A | * | 6/2017 | |
| CN | 106909172 A | | 6/2017 | |
| CN | 207182100 U | * | 4/2018 | |
| CN | 108475071 A | | 8/2018 | |
| CN | 108985193 A | | 12/2018 | |
| CN | 110139038 A | | 8/2019 | |
| GB | 2468345 A | * | 9/2010 | ........... B64C 39/024 |
| RU | 2531433 C1 | * | 10/2014 | |

\* cited by examiner

AUTONOMOUS ORBITING METHOD AND DEVICE AND UAV

CROSS-REFERENCE TO RELATED APPLICATIONS

This application is a continuation of International Application No. PCT/CN2020/091620, filed on May 21, 2020, which claims priority to Chinese Patent Application No. 2019104304920, filed on May 22, 2019, both of which are incorporated herein by reference in their entireties.

TECHNICAL FIELD

Embodiments of the disclosure relate to the field of unmanned aerial vehicle (UAV) technologies, and in particular, to an autonomous orbiting method and device and a UAV.

BACKGROUND

A UAV is an unmanned aircraft that controls flight attitude through radio remote control device and built-in programs. Due to its advantages including high flexibility, fast response, unmanned driving, low operating requirements and the like, the UAV is now widely used in aerial photography, plant protection, power inspection, disaster relief and many other fields.

Currently, consumer UAVs are mainly applied to aerial photography. Orbiting is one of the most popular languages of the lens for aerial photography enthusiasts. However, the orbiting requires precise trajectory control of UAVs. In addition, a gimbal also needs to be operated to steer synchronously to ensure that an orbited object is within a proper shooting range. The final photographing effect and quality also entirely depend on the proficiency of a UAV operator, which places extremely high requirements on operating skills for the operator, indirectly degrading user experience.

To this end, many consumer UAVs on the market provide an autonomous orbiting function for a point of interest. Currently, the mainstream implementations of autonomous orbiting for UAVs are all achieved based on the Global Positioning System (GPS). The UAVs use received GPS coordinates for planning orbits and corresponding orbital positioning, tracking and control. The quality of GPS signals directly determines the accuracy of autonomous orbiting. For regions with poor GPS signals (such as indoors), it is difficult for UAVs to achieve autonomous orbiting.

Therefore, the existing autonomous orbiting technology still needs to be improved.

SUMMARY

In view of this, embodiments of the disclosure provide an autonomous orbiting method and device and a UAV, to get rid of the dependence of the existing autonomous orbiting technology on GPS signals and achieve the objective of performing autonomous orbiting in regions with poor GPS signals such as indoors.

To resolve the foregoing technical problems, the embodiments of the disclosure provide the following technical solutions:

According to a first aspect, an embodiment of the disclosure provides an autonomous orbiting method, applicable to a UAV, the UAV including a binocular camera assembly, the method including:

obtaining, through the binocular camera assembly, a target footage and an orbited object selected by a user from the target footage;

obtaining a flying height of the UAV when obtaining the target footage;

determining a spatial distance between the binocular camera assembly and the orbited object based on the target footage;

detecting an optical axis direction of the binocular camera assembly in real time; and performing autonomous orbiting according to the flying height, the spatial distance and the optical axis direction of the binocular camera assembly detected in real time.

Optionally, the performing autonomous orbiting according to the flying height, the spatial distance and the optical axis direction of the binocular camera assembly detected in real time includes:

using the flying height as a target flying height of the UAV;

using the spatial distance as a target spatial distance between the binocular camera assembly and the orbited object; and maintaining the target flying height and the target spatial distance unchanged, and adjusting a flight direction of the UAV according to the optical axis direction of the binocular camera assembly detected in real time, to perform autonomous orbiting centered on the orbited object.

Optionally, the method further includes:

obtaining a moving direction of the orbited object in real time; and the maintaining the target flying height and the target spatial distance unchanged, and adjusting a flight direction of the UAV according to the optical axis direction of the binocular camera assembly detected in real time includes:

maintaining the target flying height and the target spatial distance unchanged, and adjusting a flight direction of the UAV according to the moving direction of the orbited object obtained in real time and the optical axis direction of the binocular camera assembly detected in real time.

Optionally, the method further includes:

determining a shooting mode for the orbited object; and the performing autonomous orbiting according to the flying height, the spatial distance and the optical axis direction of the binocular camera assembly detected in real time includes:

performing autonomous orbiting with reference to the shooting mode, the flying height, the spatial distance and the optical axis direction of the binocular camera assembly detected in real time.

Optionally, the performing autonomous orbiting with reference to the shooting mode, the flying height, the spatial distance and the optical axis direction of the binocular camera assembly detected in real time includes:

using the flying height as an initial flying height;

using the spatial distance as an initial spatial distance between the UAV and the orbited object;

determining a target flying height of the UAV and a target spatial distance between the UAV and the orbited object in each shooting time period according to the shooting mode, the initial flying height and the initial spatial distance; and flying in the each shooting time period according to the target flying height and the target spatial distance, and adjusting a flight direction of the UAV according to the optical axis direction of the binocular camera assembly detected in real time, to perform autonomous orbiting centered on the orbited object.

Optionally, the obtaining, through the binocular camera assembly, a target footage and an orbited object selected by a user from the target footage includes:

receiving a control instruction sent by a remote control device, where the remote control device is communicably connected to the UAV;

flying to a target shooting position according to the control instruction; and using a footage acquired by the binocular camera assembly at the target shooting position as the target footage, and obtaining the orbited object selected by the user from the target footage.

Optionally, the control instruction includes a joystick instruction or an operating instruction for a footage acquired in real time.

According to a second aspect, an embodiment of the disclosure provides an autonomous orbiting device, applicable to a UAV, the UAV including a binocular camera assembly, the device including:

an obtaining unit, configured to obtain, through the binocular camera assembly, a target footage and an orbited object selected by a user from the target footage; and obtain a flying height of the UAV when obtaining the target footage;

a distance determining unit, configured to determine a spatial distance between the binocular camera assembly and the orbited object based on the target footage;

an optical axis detection unit, configured to detect an optical axis direction of the binocular camera assembly in real time; and an orbiting unit, configured to perform autonomous orbiting according to the flying height, the spatial distance and the optical axis direction of the binocular camera assembly detected in real time.

Optionally, the orbiting unit is further configured to:

use the flying height as a target flying height of the UAV;

use the spatial distance as a target spatial distance between the binocular camera assembly and the orbited object; and maintain the target flying height and the target spatial distance unchanged, and adjust a flight direction of the UAV according to the optical axis direction of the binocular camera assembly detected in real time, to perform autonomous orbiting centered on the orbited object.

Optionally, the device further includes:

a monitoring unit, configured to obtain a moving direction of the orbited object in real time.

That the orbiting unit maintains the target flying height and the target spatial distance unchanged, and adjusts a flight direction of the UAV according to the optical axis direction of the binocular camera assembly detected in real time is specifically:

maintaining the target flying height and the target spatial distance unchanged, and adjusting a flight direction of the UAV according to the moving direction of the orbited object obtained in real time and the optical axis direction of the binocular camera assembly detected in real time.

Optionally, the device further includes:

a shooting mode determining unit, configured to determine a shooting mode for the orbited object.

The orbiting unit is configured to perform autonomous orbiting with reference to the shooting mode, the flying height, the spatial distance and the optical axis direction of the binocular camera assembly detected in real time.

Optionally, the orbiting unit is further configured to:

use the flying height as an initial flying height;

use the spatial distance as an initial spatial distance between the UAV and the orbited object;

determine a target flying height of the UAV and a target spatial distance between the UAV and the orbited object in each shooting time period according to the shooting mode, the initial flying height and the initial spatial distance; and fly in the each shooting time period according to the target flying height and the target spatial distance, and adjust a flight direction of the UAV according to the optical axis direction of the binocular camera assembly detected in real time, to perform autonomous orbiting centered on the orbited object.

According to a third aspect, an embodiment of the disclosure provides a UAV, including:

a body;

arms, connected to the body;

power assemblies, disposed on the arms;

a binocular camera assembly, disposed on the body;

a processor, disposed in the body and communicably connected to the binocular camera assembly; and a memory, communicably connected to the processor, where the memory stores instructions executable by the processor, the instructions, executed by the processor, enabling the processor to perform the autonomous orbiting method as described above.

According to a fourth aspect, an embodiment of the disclosure further provides non-transitory computer-readable storage medium, the non-transitory computer-readable storage medium storing computer-executable instructions, the computer-executable instructions being used for enabling the UAV to perform the autonomous orbiting method described above.

According to a fifth aspect, an embodiment of the disclosure further provides a computer program product, including a computer program stored in a non-transitory computer-readable storage medium, the computer program including program instructions, the program instructions, when executed by a UAV, causing the UAV to perform the autonomous orbiting method described above.

The embodiments of the disclosure have the following beneficial effects: Different from the related art, the autonomous orbiting method and device and the UAV provided in the embodiments of the disclosure implement autonomous orbiting based on visual sensing. On the one hand, consumer UAVs featuring aerial photography are usually equipped with a binocular camera assembly. Therefore, circling of the UAVs is kept out of serious dependence on GPS signals without additional hardware costs. The UAVs can well complete autonomous orbiting tasks even in regions with poor GPS signals such as indoors. On the other hand, a flight trajectory of a UAV can always be adjusted according to a photographing effect that a user expects, thereby implementing photographing effect-oriented autonomous orbiting of a UAV in the real sense.

BRIEF DESCRIPTION OF THE DRAWINGS

To describe the technical solutions in the embodiments of the disclosure more clearly, the following briefly describes the accompanying drawings required for describing the embodiments of the disclosure. Obviously, the accompanying drawings in the following descriptions are merely some embodiments of the invention. Those of ordinary skill in the art may further obtain other accompanying drawings according to the accompanying drawings without creative efforts.

DETAILED DESCRIPTION

To make the objectives, technical solutions and advantages of the disclosure clearer and more comprehensible, the following further describes the disclosure in detail with reference to the accompanying drawings and embodiments. It should be understood that the embodiments herein are provided for describing the disclosure and not intended to limit the disclosure.

It should be noted that, if no conflict occurs, features in the embodiments of the disclosure may be combined with each other and fall within the protection scope of the disclosure. In addition, although functional module division is performed in the schematic diagram of the device, and a logical sequence is shown in the flowchart, in some cases, the shown or described steps may be performed by using module division different from the module division in the device or in a sequence different from the sequence in the flowchart.

To ensure the photographing effect of autonomous orbiting while getting rid of the dependence of a UAV on GPS signals during autonomous circling, embodiments of the disclosure provide a novel autonomous orbiting method and device and a novel UAV. The autonomous orbiting method and device are applicable to any type of UAV, for example, a tilt-rotor UAV or a rotary-wing UAV. The UAV is equipped with a binocular camera assembly for acquiring image data. In addition, in the embodiments of the disclosure, the "orbiting" means that a UAV flying over an orbited object circles around a projected point of the orbited object on the plane in which the UAV is located, and shoots the orbited object while circling.

Specifically, the autonomous orbiting method provided in the embodiments of the disclosure is a vision-based photographing effect-oriented autonomous orbiting method for a UAV, specifically including: obtaining a target footage and an orbited object selected by a user from the target footage through a binocular camera assembly equipped on the UAV, and obtaining a flying height of the UAV and determining a spatial distance between the binocular camera assembly and the orbited object when obtaining the target footage; detecting an optical axis direction of the binocular camera assembly in real time; and performing autonomous orbiting according to the flying height, the spatial distance and the optical axis direction of the binocular camera assembly detected in real time. In the embodiments of the disclosure, the "target footage" refers to the photographing effect of an orbited object (including the position and size of the orbited object in a to-be-shot footage) in a to-be-shot footage that a user wants to obtain. Therefore, autonomous orbiting is performed according to a flying height of the UAV, a spatial distance between the binocular camera assembly and the orbited object and an optical axis direction of the binocular camera assembly detected in real time when obtaining the target footage. On one hand, the UAV can perform autonomous circling and shooting without relying on GPS signals. On the other hand, the photographing effect corresponding to that of the "target footage" can always be obtained to ensure the quality of autonomous orbiting performed by the UAV.

The autonomous orbiting device provided in the embodiments of the disclosure is a virtual device that includes software programs and that can implement the autonomous orbiting method provided in the embodiments of the disclosure. The autonomous orbiting device and the autonomous orbiting method provided in the embodiments of the disclosure are based on the same inventive concept, and have the same technical features and beneficial effects.

The embodiments of the disclosure are further described below with reference to the accompanying drawings.

Embodiment 1

Figure 1:
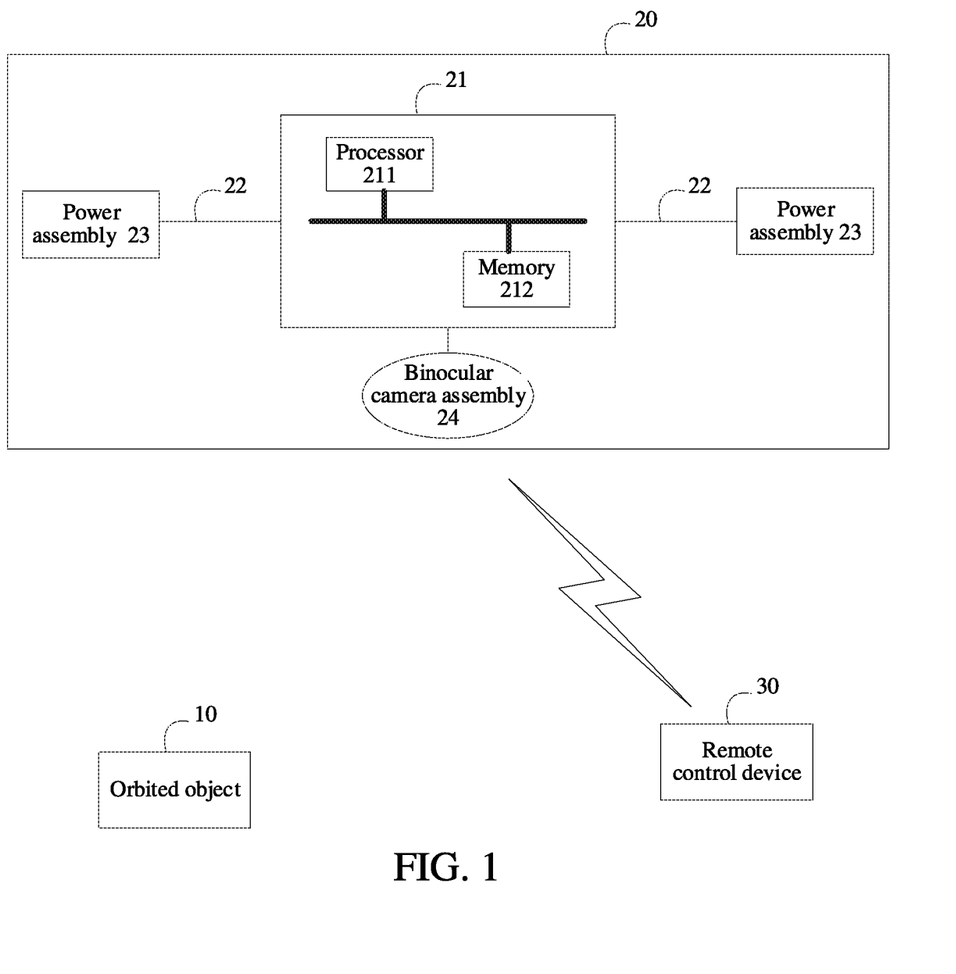
FIG. 1 is a schematic diagram of one of application environments of an autonomous orbiting method according to an embodiment of the disclosure.

FIG. 1 shows one of application environments of an autonomous orbiting method according to an embodiment of the disclosure. Specifically, referring to FIG. 1, the application environment may include an orbited object 10, a UAV 20 and a remote control device 30. The UAV 20 and the remote control device 30 may be communicably connected to each other in any manner. The autonomous orbiting method provided in this embodiment of the disclosure may be performed by the UAV 20.

The orbited object 10 may be any object on which a user wants to perform orbiting. The orbited object 10 may be a static object (that is, an object always remains in situ and still) such as a building, a tree or an island. The orbited object 10 may alternatively be a moving object (that is, an object in a moving state) such as a person, an animal, a car or a boat. The orbited object 10 may be determined according to an actual application.

The UAV 20 may be any type of UAV, and may specifically include a body 21, arms 22 connected to the body 21, power assemblies 23 disposed on the arms 22 and a binocular camera assembly 24 disposed on the body 21.

The body 21 is a main part of the UAV 20. Various functional circuit assemblies of the UAV 20 can be disposed in the body 21. For example, in this embodiment, a processor 211 and a memory 212 are disposed in the body 21. The processor 211 and the memory 212 may be communicably connected by a system bus or another means.

The processor 211 may be specifically a micro-programmed control unit (MCU), a digital signal processor (DSP) or the like, and is configured to provide calculation and control capabilities for controlling the UAV 20 to fly and perform related tasks. For example, the UAV 20 is controlled to perform any autonomous orbiting method provided in this embodiment of the disclosure.

The memory 212 may be specifically a non-transitory computer-readable storage medium, and may be configured to store a non-transitory software program, a non-transitory computer-executable program and a module such as program instructions or modules corresponding to the autonomous orbiting method in the embodiments of the disclosure. The processor 211 runs the non-transitory software program, the instructions and the module stored in the memory 212, to implement the autonomous orbiting method in any of the method embodiments described below. Specifically, the memory 212 may include a high-speed random access memory, and may further include a non-transitory memory such as at least one magnetic disk storage device, a flash storage device or other non-transitory solid-state storage devices. In some embodiments, the memory 212 may further include memories remotely disposed relative to the processor 211. The remote memories may be connected to the processor 211 by a network. Examples of the foregoing network include, but are not limited to, the Internet, an intranet, a local area network, a mobile communication network and a combination thereof.

The quantity of the arms 22 is at least two. The arms 22 can be fixedly connected to, integrally formed with or detachably connected to the body 21, which is not specifically limited in the embodiments of the disclosure.

The power assembly 23 may generally include an electronic governor, a motor and a propeller. The motor is connected between the electronic governor and the propeller. The motor and the propeller are arranged on a corresponding arm 22. The electronic governor may be communicably connected to the processor 211, can receive a driving signal sent by the processor 211, and provide a driving current for the motor according to the driving signal, so as to control rotation speeds of the motor and the propeller, thereby providing a flying lift or a flying power for the UAV 20.

The binocular camera assembly 24 may be any photographing device capable of acquiring left and right views. For example, the binocular camera assembly 24 may specifically include a first image acquisition device and a second image acquisition device. The first image acquisition device and the second image acquisition device may be directly installed under the body 21 or through a gimbal. In some embodiments, the first image acquisition device may be a main camera and is configured to perform aerial photography and provide a footage to a user. The second image acquisition device may be an auxiliary camera and is configured to implement binocular vision sensing in combination with the main camera. The binocular camera assembly 24 is communicably connected to the processor 211, can feed back acquired image information to the processor 211, and can perform shooting under the control of the processor 211.

The remote control device 30 is a ground terminal device corresponding to the UAV 20 and is configured to remotely control the UAV 20. The remote control device 30 may be specifically a remote control, a mobile terminal (for example, a smart phone, a tablet computer or a notebook computer), a wearable device or another device. The remote control device 30 can receive user input and send corresponding control instructions to the UAV 20 according to the user input, so as to control the UAV 20 to perform corresponding tasks such as adjusting flight attitude and performing autonomous orbiting. The remote control device 30 may further receive information or image data from the UAV 20 and present the information or image data to a user through a display screen of the remote control device 30 or another display device.

In practical applications, when needing to orbit an orbited object 10, a user may first control the UAV 20 through the remote control device 30 to obtain a target footage including the orbited object 10. The target footage represents the photographing effect of the orbited object 10 that a user expects to obtain in a subsequent to-be-shot footage. When determining that the target footage has been obtained, the user may send an autonomous orbiting instruction to a processor 211 of the UAV 20 through a function control on the remote control device 30, to instruct the UAV 20 to perform autonomous orbiting on the orbited object 10 based on the target footage.

After receiving the autonomous orbiting instruction, the processor 211 of the UAV 20 may first obtain, through the binocular camera assembly 24, the target footage and the orbited object 10 selected by the user from the target footage; simultaneously, obtain a flying height of the UAV 20 while obtaining the target footage, and determine a spatial distance between the binocular camera assembly 24 and the orbited object 10 based on the target footage; detect an optical axis direction of the binocular camera assembly in real time 24; and perform autonomous orbiting according to the flying height, the spatial distance and the optical axis direction of the binocular camera assembly detected in real time. Through the foregoing method, autonomous orbiting can be performed based on visual sensing. On the one hand, the method gets rid of the dependence on GPS signals, so that autonomous circling and shooting can be performed in regions with weak GPS signals such as indoors. On the other hand, the method is photographing effect-oriented, so that the photographing quality of autonomous orbiting can be ensured.

It should be noted that, the above application environment is only for exemplary descriptions. In practical applications, the autonomous orbiting method and related devices provided in the embodiments of the disclosure may be further extended to other suitable application environments, and are not limited to the application environment shown in FIG. 1. For example, in some other embodiments, the quantity of UAVs 20 and the quantity of remote control devices 30 may alternatively be more than one.

Embodiment 2

Figure 2:
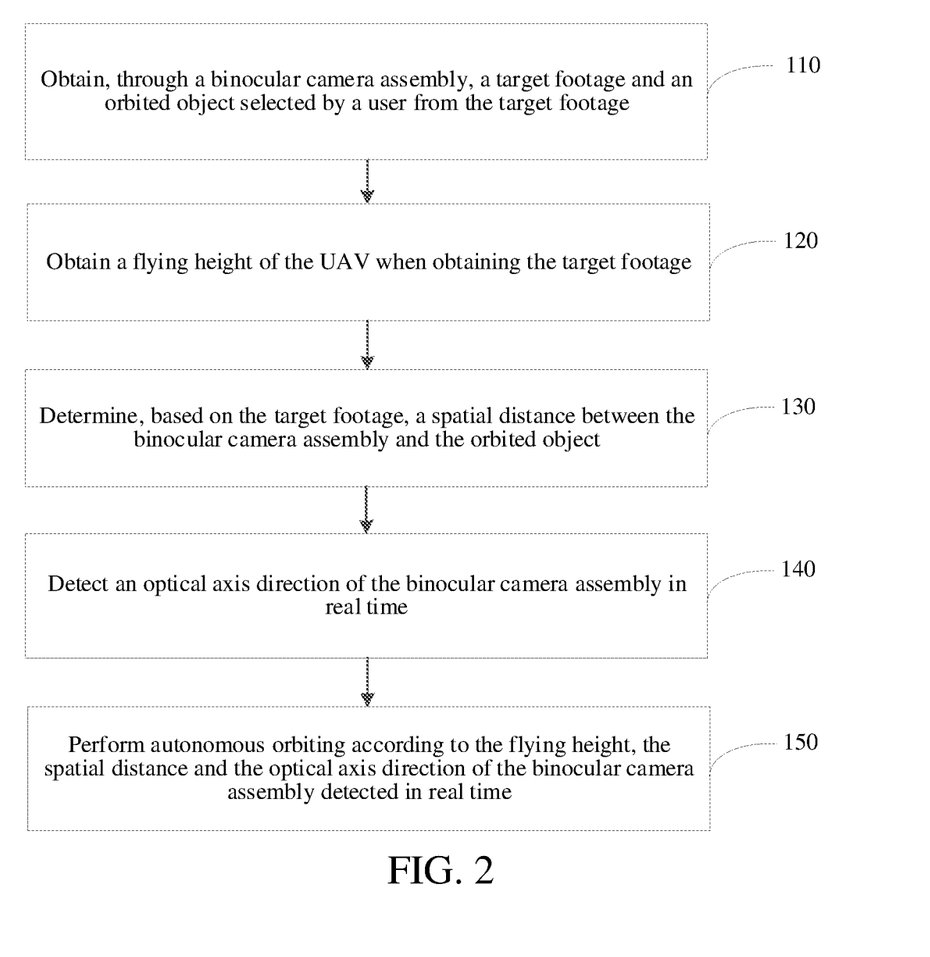
FIG. 2 is a schematic flowchart of an autonomous orbiting method according to an embodiment of the disclosure.

FIG. 2 is a schematic flowchart of an autonomous orbiting method according to an embodiment of the disclosure. The method may be performed by any type of UAV including a binocular camera assembly for example, the UAV 20 shown in FIG. 1.

Specifically, referring to FIG. 2, the method may include, but is not limited to, the following steps:

Step 110: Obtain, through a binocular camera assembly, a target footage and an orbited object selected by a user from the target footage.

In this embodiment, the "target footage" is a footage that a user expects to obtain, and is used for determining the photographing effect of an orbited object in a to-be-shot footage, for example, the position and the size of the orbited object in the to-be-shot footage. Specifically, the target footage obtained by the binocular camera assembly usually includes a left camera view and a right camera view for the same scene. A UAV may send one of the views (the left camera view or the right camera view) to a remote control device for a user to view and confirm.

In this embodiment, a specific implementation of obtaining, through the binocular camera assembly, a target footage and selecting an orbited object from the target footage may be specifically: receiving a control instruction sent by a remote control device, where the remote control device is communicably connected to the UAV; flying to a target shooting position according to the control instruction; and using a footage acquired by the binocular camera assembly at the target shooting position as the target footage and obtaining the orbited object selected by the user from the target footage.

The control instruction refers to an instruction for operating the flight of a UAV, and may specifically include a joystick instruction or an operating instruction for a footage acquired in real time. For example, a user may adjust, with reference to a footage fed back in real time by a binocular camera assembly, a spatial position of the UAV in the airspace by controlling a joystick on a remote control device, so as to adjust the position and the size of an orbited object in a footage. Alternatively, a user may perform, on a remote control device, operations, such as panning, zooming in and zooming out, on a footage acquired in real time. Based on the operations, the remote control device generates corresponding operating instructions and sends the corresponding operating instructions to the UAV. After receiving the operating instructions, the UAV can generate corresponding spatial position adjustment instructions (for example, flying forward, flying backward, flying left, flying right, flying upward and flying downward) to adjust a spatial position.

The "target shooting position" refers to a position at which the UAV is located when the user obtains the expected photographing effect. In practical applications, when obtaining an expected footage, the user may select an orbited object from the footage and send an autonomous orbiting instruction including information about the orbited object to the UAV. When receiving the autonomous orbiting instruction including the information about the orbited object sent by the remote control device, it is determined that the UAV has flown to a target shooting position. In this case, a footage acquired by the binocular camera assembly at the current moment can be directly obtained. The footage can be used as the target footage. Then, the orbited object selected by the user from the target footage is obtained according to the information about the orbited object.

Step 120: Obtain a flying height of the UAV when obtaining the target footage.

In this embodiment, the flying height refers to a height of the UAV relative to ground.

When obtaining the target footage, the UAV can determine a flying height at the current moment through any type of height sensor.

Step 130: Determine a spatial distance between the binocular camera assembly and the orbited object based on the target footage.

In this embodiment, the spatial distance between the binocular camera assembly and the orbited object is determined based on the target footage when the target footage is obtained.

The target footage includes a left camera view and a right camera view for the same scene. Consequently, by stereo matching the left camera view and the right camera view, a disparity value of the orbited object can be obtained. Further, the spatial distance between the binocular camera assembly and the orbited object can be obtained.

Step 140: Detect an optical axis direction of the binocular camera assembly in real time.

In this embodiment, the optical axis direction of the binocular camera assembly refers to a direction of a center line of the binocular camera assembly.

In practical applications, a current flight direction of the UAV can be obtained in real time. A relative angle between an optical axis of the binocular camera assembly and the UAV can be measured by an angle sensor. Moreover, the optical axis direction of the binocular camera assembly can be determined in real time by referring to the current flight direction of the UAV and the relative angle between the optical axis of the binocular camera assembly and the UAV.

Step 150: Perform autonomous orbiting according to the flying height, the spatial distance and the optical axis direction of the binocular camera assembly detected in real time.

According to the imaging principle of a camera, by adjusting a relative spatial position between the binocular camera assembly of the UAV and the orbited object, the photographing effect, such as the position and the size of the orbited object, in a footage of the binocular camera assembly can be adjusted. Therefore, during the flight of the UAV, the photographing effect consistent with that of the target footage can be obtained provided that the flying height and the spatial distance remain unchanged.

In addition, according to the flying height and the spatial distance, a surrounding radius of the UAV when the UAV circles around the orbited object can further be determined (that is, a line between a projected point of an orbited object on a plane in which the UAV is located and the UAV). According to the principle of circular motion, if the UAV always moves in a direction tangent to the surrounding radius on a horizontal plane, circling can be performed. The direction tangent to the surrounding radius is a direction spatially perpendicular to the optical axis of the binocular camera assembly on a horizontal plane. Therefore, by detecting an optical axis direction of the binocular camera assembly in real time, a flight direction of the UAV can be adjusted in real time to perform circling and shooting.

In view of this, when performing autonomous orbiting for a static orbited object, the UAV may use the flying height as a target flying height of the UAV; use the spatial distance as a target spatial distance between the binocular camera assembly and the orbited object; and during the flight, maintain the target flying height and the target spatial distance unchanged, and adjust a flight direction of the UAV according to the optical axis direction of the binocular camera assembly detected in real time, to perform autonomous orbiting centered on the orbited object. The adjusting a flight direction of the UAV according to the optical axis direction of the binocular camera assembly detected in real time may be specifically: adjusting the flight direction of the UAV to a direction spatially perpendicular to the optical axis direction on a horizontal plane.

Further, in some embodiments, when the orbited object is in a moving state, to keep performing autonomous orbiting on the orbited object, the UAV, in addition to circling, further needs to move in synchronization with the orbited object, so that the orbited object presents a relatively static state in a to-be-shot footage.

In this embodiment, before step 150 is performed, the method may further include: obtaining a moving direction of the orbited object in real time. In this case, the maintaining the target flying height and the target spatial distance unchanged, and adjusting a flight direction of the UAV according to the optical axis direction of the binocular camera assembly detected in real time is specifically: maintaining the target flying height and the target spatial distance unchanged, and adjusting a flight direction of the UAV according to the moving direction of the orbited object obtained in real time and the optical axis direction of the binocular camera assembly detected in real time.

The UAV may determine a moving direction of the orbited object by comparing two consecutive frames of footage obtained by the binocular camera assembly or may determine a moving direction of the orbited object by comparing a footage obtained by the binocular camera assembly at the current moment with the target footage.

From the above technical solutions, it can be learned that this embodiment of the disclosure has the following beneficial effects: The autonomous orbiting method provided in the embodiments of the disclosure includes: obtaining, through a binocular camera assembly, a target footage and an orbited object selected by a user from the target footage when receiving an autonomous orbiting instruction; simultaneously, obtaining a flying height of the UAV and determining a spatial distance between the binocular camera assembly and the orbited object while obtaining the target footage; detecting an optical axis direction of the binocular camera assembly in real time; and performing autonomous orbiting according to the flying height, the spatial distance and the optical axis direction of the binocular camera assembly detected in real time. On the one hand, the UAV can perform autonomous circling and shooting without relying on GPS signals. On the other hand, the photographing effect corresponding to that of the "target footage" can always be obtained to ensure the quality of autonomous orbiting performed by the UAV.

Embodiment 3

Figure 3:
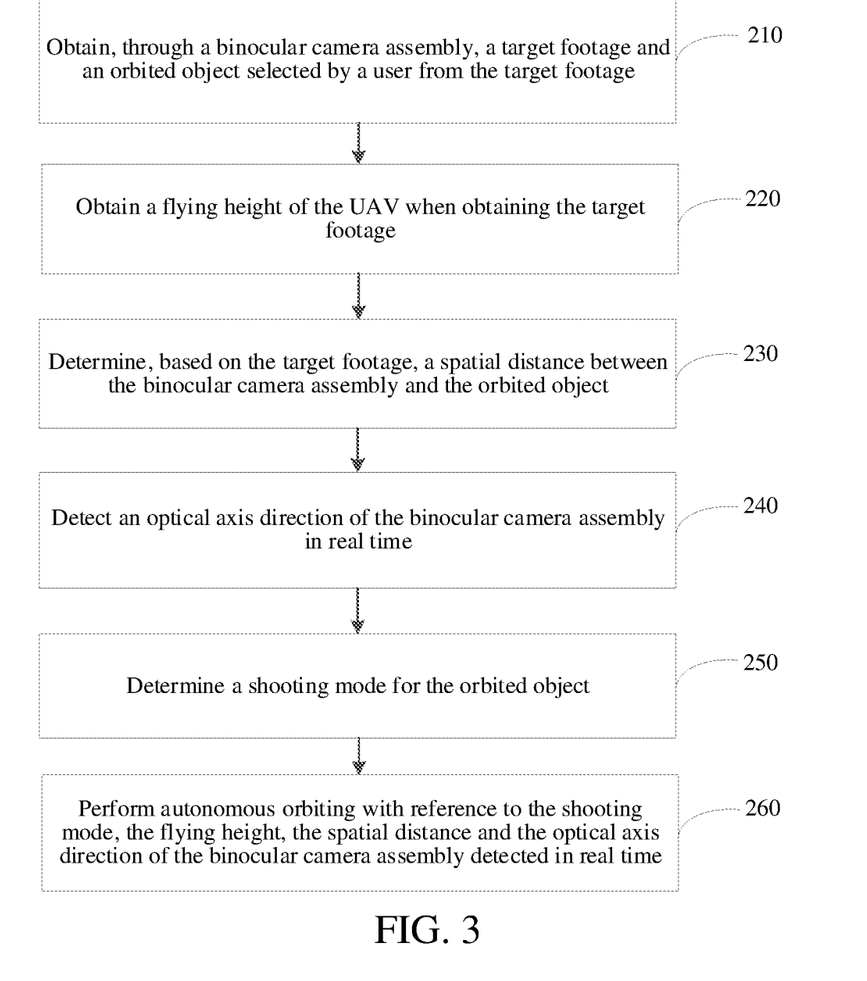
FIG. 3 is a schematic flowchart of another autonomous orbiting method according to an embodiment of the disclosure.

FIG. 3 is a schematic flowchart of an autonomous orbiting method according to an embodiment of the disclosure. The method is similar to the autonomous orbiting method described in Embodiment 2, and differs from the autonomous orbiting method described in Embodiment 2 in that: In this embodiment, the UAV can further perform personalized autonomous orbiting according to a shooting mode set by a user.

Specifically, referring to FIG. 3, the method may include, but is not limited to, the following steps:

Step 210: Obtain, through a binocular camera assembly, a target footage and an orbited object selected by a user from the target footage.

Step 220: Obtain a flying height of the UAV when obtaining the target footage.

Step 230: Determine a spatial distance between the binocular camera assembly and the orbited object based on the target footage.

Step 240: Detect an optical axis direction of the binocular camera assembly in real time.

Step 250: Determine a shooting mode for the orbited object.

In this embodiment, the shooting mode refers to a shooting method adopted when orbiting the orbited object. A user can define a shooting mode while inputting an autonomous orbiting instruction for the orbited object.

Specifically, the shooting mode may include, but is not limited to: a constant mode, a gradual change mode, a custom mode and the like. The constant mode means always performing autonomous orbiting according to the photographing effect of the target footage. The gradual change mode is to gradually change the position and/or the size of the orbited object in a footage during orbiting. The custom mode is to adjust the photographing effect of the orbited object in a footage according to custom settings of a user during orbiting.

Step 260: Perform autonomous orbiting with reference to the shooting mode, the flying height, the spatial distance and the optical axis direction of the binocular camera assembly detected in real time.

In this embodiment, autonomous orbiting is further performed with reference to the shooting mode in addition to the flying height, the spatial distance and the optical axis direction of the binocular camera assembly detected in real time.

Specifically, if the shooting mode is a constant shooting mode, the autonomous orbiting method described in Embodiment 2 can be directly adopted.

If the shooting mode is a gradual change mode, a custom mode or another mode, a specific implementation of performing autonomous orbiting with reference to the shooting mode, the flying height, the spatial distance and the optical axis direction of the binocular camera assembly detected in real time may be: using the flying height as an initial flying height; using the spatial distance as an initial spatial distance between the UAV and the orbited object; determining a target flying height of the UAV and a target spatial distance between the UAV and the orbited object in each shooting time period according to the shooting mode, the initial flying height and the initial spatial distance; and flying in the each shooting time period according to the target flying height and the target spatial distance, and adjusting a flight direction of the UAV according to the optical axis direction of the binocular camera assembly detected in real time, to perform autonomous orbiting centered on the orbited object.

It should be noted that the foregoing step 210 to step 240 respectively have the same technical features as those of step 110 to step 140 in the autonomous orbiting method shown in FIG. 2. Therefore, for specific implementations of step 110 to step 140, reference may be made to corresponding descriptions in step 110 to step 140 in the foregoing embodiment. Details are not described again in this embodiment.

From the above technical solutions, it can be learned that this embodiment of the disclosure has the following beneficial effects: the autonomous orbiting method provided in this embodiment can perform "photographing effect"-oriented personalized autonomous orbiting by further performing autonomous orbiting with reference to a shooting mode selected by a user, thereby providing more interesting experiences for autonomous orbiting.

Embodiment 4

Figure 4:
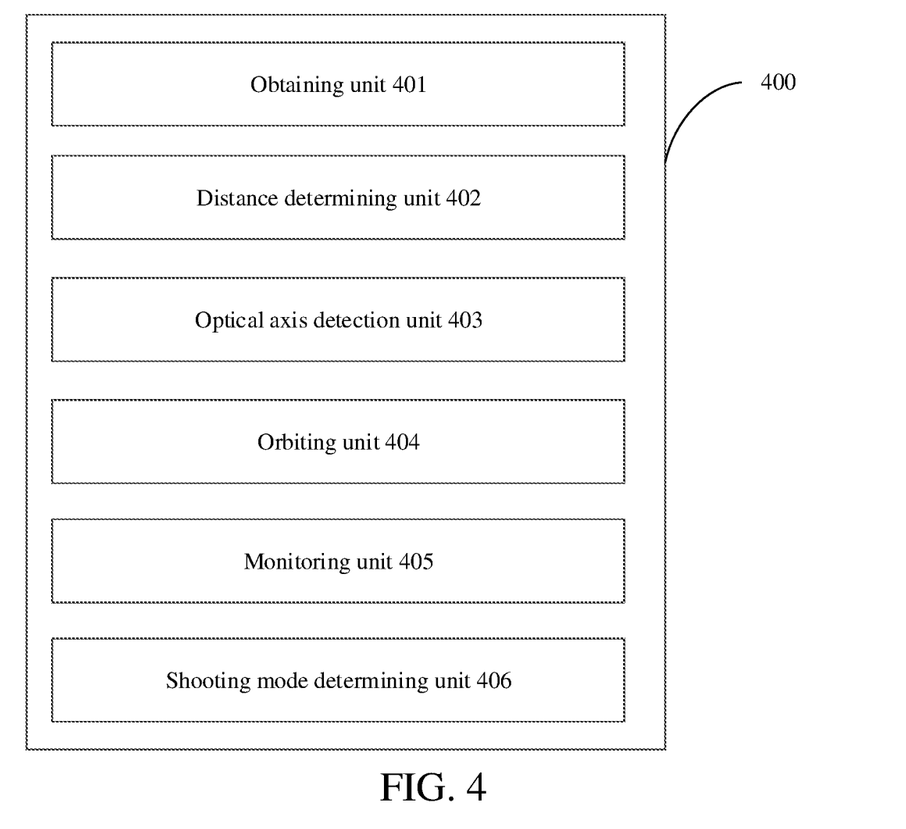
FIG. 4 is a schematic diagram of structural composition of an autonomous orbiting device according to an embodiment of the disclosure.

FIG. 4 is a schematic structural diagram of an autonomous orbiting device 400 according to an embodiment of the disclosure. The autonomous orbiting device 400 may be run on a processor 211 of the UAV 20 shown in FIG. 1.

Specifically, referring to FIG. 4, the device 400 includes: an obtaining unit 401, a distance determining unit 402, an optical axis detection unit 403 and an orbiting unit 404.

The obtaining unit 401 is configured to obtain, through the binocular camera assembly, a target footage and an orbited object selected by a user from the target footage; and is further configured to obtain a flying height of the UAV when obtaining the target footage.

The distance determining unit 402 is configured to determine a spatial distance between the binocular camera assembly and the orbited object based on the target footage.

The optical axis detection unit 403 is configured to detect an optical axis direction of the binocular camera assembly in real time.

The orbiting unit 404 is configured to perform autonomous orbiting according to the flying height, the spatial distance and the optical axis direction of the binocular camera assembly detected in real time.

In this embodiment, when receiving an autonomous orbiting instruction, the UAV may use the obtaining unit 401 to obtain a target footage, an orbited object selected by a user from the target footage and a flying height of the UAV when obtaining the target footage through the binocular camera assembly; simultaneously, use the distance determining unit 402 to determine a spatial distance between the binocular camera assembly and the orbited object based on the target footage; and use the optical axis detection unit 403 to detect an optical axis direction of the binocular camera assembly in real time. Further, the orbiting unit 404 performs autonomous orbiting according to the flying height, the spatial distance and the optical axis direction of the binocular camera assembly detected in real time.

In some embodiments, that the obtaining unit 401 obtains, through the binocular camera assembly, a target footage and an orbited object selected by a user from the target footage may be specifically: receiving a control instruction sent by a remote control device, where the remote control device is communicably connected to the UAV; flying to a target shooting position according to the control instruction; and using a footage acquired by the binocular camera assembly at the target shooting position as the target footage and obtaining the orbited object selected by the user from the target footage. Further, in some embodiments, the control instructions include a joystick instruction or an operating instruction for a footage acquired in real time.

In some embodiments, the orbiting unit 404 is further configured to: use the flying height as a target flying height of the UAV; use the spatial distance as a target spatial distance between the binocular camera assembly and the orbited object; and maintain the target flying height and the target spatial distance unchanged, and adjust a flight direction of the UAV according to the optical axis direction of the binocular camera assembly detected in real time, to perform autonomous orbiting centered on the orbited object.

Further, in some embodiments, to perform autonomous orbiting on orbited objects in a moving state, the autonomous orbiting device 400 further includes:

a monitoring unit 405, configured to obtain a moving direction of the orbited object in real time. In this case, that the orbiting unit 404 maintains the target flying height and the target spatial distance unchanged, and adjusting a flight direction of the UAV according to the optical axis direction of the binocular camera assembly detected in real time is specifically: maintaining the target flying height and the target spatial distance unchanged, and adjusting a flight direction of the UAV according to the moving direction of the orbited object obtained in real time and the optical axis direction of the binocular camera assembly detected in real time.

In addition, in other embodiments, the autonomous orbiting device 400 further includes:

a shooting mode determining unit 406, configured to determine a shooting mode for the orbited object. Therefore, in this embodiment, the orbiting unit 404 is configured to: perform autonomous orbiting with reference to the shooting mode, the flying height, the spatial distance and the optical axis direction of the binocular camera assembly detected in real time.

Specifically, in some embodiments, the orbiting unit 404 is further configured to: use the flying height as an initial flying height; use the spatial distance as an initial spatial distance between the UAV and the orbited object; determine a target flying height of the UAV and a target spatial distance between the UAV and the orbited object in each shooting time period according to the shooting mode, the initial flying height and the initial spatial distance; and fly in the each shooting time period according to the target flying height and the target spatial distance, and adjust a flight direction of the UAV according to the optical axis direction of the binocular camera assembly detected in real time, to perform autonomous orbiting centered on the orbited object.

It should be noted that, the foregoing described device embodiments are merely examples. The units described as separate parts may or may not be physically separate, that is, may be located in one position or may be distributed on a plurality of network units. Some or all of the units or modules may be selected according to actual needs to achieve the objectives of the solutions of the embodiments.

Because the autonomous orbiting device is based on the same inventive concept as the autonomous orbiting method described in the second or third method embodiment, corresponding content in the foregoing method embodiment is also applicable to the device embodiment. Details are not described herein again.

From the above technical solutions, it can be learned that this embodiment of the disclosure has the following beneficial effects: The autonomous orbiting device provided in this embodiment of the disclosure uses the obtaining unit 401 to obtain, through a binocular camera assembly, a target footage, an orbited object selected by the user from the target footage and a flying height of the UAV when obtaining the target footage; simultaneously, uses the distance determining unit 402 to determine a spatial distance between the binocular camera assembly and the orbited object based on the target footage; and uses the optical axis detection unit 403 to detect an optical axis direction of the binocular camera assembly in real time. Further, the orbiting unit 404 performs autonomous orbiting according to the flying height, the spatial distance and the optical axis direction of the binocular camera assembly detected in real time. On the one hand, the UAV performs autonomous circling and shooting without relying on GPS signals. On the other hand, the photographing effect corresponding to that of the "target footage" can always be obtained to ensure the quality of autonomous orbiting performed by the UAV.

The embodiments of the disclosure further provide a non-transitory computer-readable storage medium, the non-transitory computer-readable storage medium storing computer-executable instructions, the computer-executable instructions, executed by one or more processors, for example, executed by the processor 211 in FIG. 1, causing the one or more processors to perform the autonomous orbiting method in any of the foregoing method embodiments. For example, step 110 to step 150 of the method in FIG. 2 or step 210 to step 260 of the method in FIG. 3 described above are performed to implement functions of units 401 to 406 in FIG. 4.

In addition, it should be understood that based on the descriptions of the foregoing implementations, those of ordinary skill in the art may clearly understand that the implementations may be implemented by software in addition to a universal hardware platform or by hardware. For example, functions of the obtaining unit 401 are implemented through a binocular camera assembly and related sensors such as a height sensor. Functions of the distance determining unit 402 are implemented through a graphics processing unit. Functions of the optical axis detection unit 403 are implemented through orientation sensors such as a gyroscope. Functions of the orbiting unit 404 are implemented through cooperation between a flight control module and a binocular camera assembly.

Those of ordinary skill in the art may further understand that all or some of procedures in the foregoing embodiment methods may also be implemented by a computer program in a computer program product instructing relevant hardware. The computer program may be stored in a non-transitory computer-readable storage medium. The computer program includes program instructions. When the program instructions are executed by a UAV, the UAV is enabled to execute the procedures of the foregoing method embodiments. The storage medium may be a magnetic disk, an optical disc, a read-only memory (ROM), a RAM or the like.

The above products (including: a UAV, a non-transitory computer-readable storage medium and a computer program product) can perform the autonomous orbiting method provided in the embodiments of the disclosure, and have corresponding functional modules and beneficial effects for performing the autonomous orbiting method. For technical details not described in detail in this embodiment, reference may be made to the autonomous orbiting method provided in the foregoing embodiments of the disclosure.

Finally, it should be noted that the foregoing embodiments are merely used to describe the technical solutions of the disclosure, but are not intended to limit the disclosure. Under the concept of the disclosure, the technical features in the foregoing embodiments or different embodiments may be combined. The steps may be implemented in any sequence. There may be many other changes in different aspects of the disclosure. For brevity, those are not provided in detail. Although the disclosure is described in detail with reference to the foregoing embodiments, those of ordinary skill in the art should understand that they may still make modifications to the technical solutions described in the foregoing embodiments or make equivalent replacements to some technical features thereof without making the corresponding technical solutions depart from the scope of the technical solutions of the embodiments of the disclosure.

What is claimed is:

1. An autonomous orbiting method, applicable to an unmanned aerial vehicle (UAV), the UAV comprising a binocular camera assembly, the method comprising:
    obtaining, through the binocular camera assembly, a target footage and an orbited object selected by a user from the target footage;
    obtaining a flying height of the UAV when obtaining the target footage;
    determining a spatial distance between the binocular camera assembly and the orbited object based on the target footage; wherein the target footage comprises a left camera view and a right camera view for the same shooting scene, and the step of determining a spatial distance between the binocular camera assembly and the orbited object comprises: obtaining a disparity value of the orbited object by stereo matching the left camera view and the right camera view, so as to obtain the spatial distance between the binocular camera assembly and the orbited object;
    detecting an optical axis direction of the binocular camera assembly in real time; and
    performing autonomous orbiting according to the flying height, the spatial distance and the optical axis direction of the binocular camera assembly detected in real time; using the flying height as a target flying height of the UAV; using the spatial distance as a target spatial distance between the binocular camera assembly and the orbited object; and maintaining the target flying height and the target spatial distance unchanged, and adjusting a flight direction of the UAV according to the optical axis direction of the binocular camera assembly detected in real time, to perform the autonomous orbiting centered on the orbited object.

2. The method according to claim 1, wherein the method further comprises:
    obtaining a moving direction of the orbited object in real time; and
    the maintaining the target flying height and the target spatial distance unchanged, and adjusting a flight direction of the UAV according to the optical axis direction of the binocular camera assembly detected in real time comprises:
        maintaining the target flying height and the target spatial distance unchanged, and adjusting a flight direction of the UAV according to the moving direction of the orbited object obtained in real time and the optical axis direction of the binocular camera assembly detected in real time.

3. The method according to claim 1, wherein the method further comprises:
    determining a shooting mode for the orbited object; and
    the performing autonomous orbiting according to the flying height, the spatial distance and the optical axis direction of the binocular camera assembly detected in real time comprises:
        performing autonomous orbiting with reference to the shooting mode, the flying height, the spatial distance and the optical axis direction of the binocular camera assembly detected in real time.

4. The method according to claim 3, wherein the performing autonomous orbiting with reference to the shooting mode, the flying height, the spatial distance and the optical axis direction of the binocular camera assembly detected in real time comprises:
    using the flying height as an initial flying height;
    using the spatial distance as an initial spatial distance between the UAV and the orbited object;
    determining a target flying height of the UAV and a target spatial distance between the UAV and the orbited object in each shooting time period according to the shooting mode, the initial flying height and the initial spatial distance; and
    flying in the each shooting time period according to the target flying height and the target spatial distance, and adjusting a flight direction of the UAV according to the optical axis direction of the binocular camera assembly detected in real time, to perform autonomous orbiting centered on the orbited object.

5. The method according to claim 1, wherein the obtaining, through the binocular camera assembly, a target footage and an orbited object selected by a user from the target footage comprises:
    receiving a control instruction sent by a remote control device, wherein the remote control device is communicably connected to the UAV;
    flying to a target shooting position according to the control instruction; and
    using a footage acquired by the binocular camera assembly at the target shooting position as the target footage, and obtaining the orbited object selected by the user from the target footage.

6. The method according to claim 5, wherein the control instruction comprises a joystick instruction or an operating instruction for a footage acquired in real time.

7. An autonomous orbiting device, applicable to an unmanned aerial vehicle (UAV), the UAV comprising a binocular camera assembly, the device comprising:
    at least a processor; and a memory communicably connected to the at least one processor, wherein the memory stores instructions executable by the at least one processor, the instructions, executed by the at least one processor, enabling the at least one processor to perform the following steps:
        obtaining, through the binocular camera assembly, a target footage and an orbited object selected by a user from the target footage;
        obtaining a flying height of the UAV when obtaining the target footage;

determining a spatial distance between the binocular camera assembly and the orbited object based on the target footage; wherein the target footage comprises a left camera view and a right camera view for the same shooting scene, and the step of determining a spatial distance between the binocular camera assembly and the orbited object comprises: obtaining a disparity value of the orbited object by the stereo matching the left camera view and the right camera view, so as to obtain the spatial distance between the binocular camera assembly and the orbited object;

detecting an optical axis direction of the binocular camera assembly in real time; and performing autonomous orbiting according to the flying height, the spatial distance and the optical axis direction of the binocular camera assembly detected in real time; using the flying height as a target flying height of the UAV; using the spatial distance as a target spatial distance between the binocular camera assembly and the orbited object; and maintaining the target flying height and the target spatial distance unchanged, and adjusting a flight direction of the UAV according to the optical axis direction of the binocular camera assembly detected in real time, to perform the autonomous orbiting centered on the orbited object.

8. The device according to claim 7, wherein the processor is further configured to:

obtain a moving direction of the orbited object in real time; and that the processor maintains the target flying height and the target spatial distance unchanged, and adjusts a flight direction of the UAV according to the optical axis direction of the binocular camera assembly detected in real time further comprises:

maintaining the target flying height and the target spatial distance unchanged, and adjusting a flight direction of the UAV according to the moving direction of the orbited object obtained in real time and the optical axis direction of the binocular camera assembly detected in real time.

9. The device according to claim 7, wherein the processor is further configured to:

determine a shooting mode for the orbited object; and
perform autonomous orbiting with reference to the shooting mode, the flying height, the spatial distance and the optical axis direction of the binocular camera assembly detected in real time.

10. The device according to claim 9, wherein the processor is further configured to:

use the flying height as an initial flying height;
use the spatial distance as an initial spatial distance between the UAV and the orbited object;
determine a target flying height of the UAV and a target spatial distance between the UAV and the orbited object in each shooting time period according to the shooting mode, the initial flying height and the initial spatial distance; and
fly in the each shooting time period according to the target flying height and the target spatial distance, and adjust a flight direction of the UAV according to the optical axis direction of the binocular camera assembly detected in real time, to perform autonomous orbiting centered on the orbited object.

11. An unmanned aerial vehicle (UAV), comprising:
a body;
arms, connected to the body;
power assemblies, disposed on the arms;
a binocular camera assembly, disposed on the body;
at least one processor, disposed in the body and communicably connected to the binocular camera assembly; and
a memory, communicably connected to the at least one processor, wherein
the memory stores instructions executable by the at least one processor, the instructions, executed by the at least one processor, enabling the at least one processor to perform the following steps:

obtaining, through the binocular camera assembly, a target footage and an orbited object selected by a user from the target footage;

obtaining a flying height of the UAV when obtaining the target footage;

determining a spatial distance between the binocular camera assembly and the orbited object based on the target footage; wherein the target footage comprises a left camera view and a right camera view for the same shooting scene, and the step of determining a spatial distance between the binocular camera assembly and the orbited object comprises: obtaining a disparity value of the orbited object by the stereo matching the left camera view and the right camera view, so as to obtain the spatial distance between the binocular camera assembly and the orbited object;

detecting an optical axis direction of the binocular camera assembly in real time; and performing autonomous orbiting according to the flying height, the spatial distance and the optical axis direction of the binocular camera assembly detected in real time; using the flying height as a target flying height of the UAV; using the spatial distance as a target spatial distance between the binocular camera assembly and the orbited object; and maintaining the target flying height and the target spatial distance unchanged, and adjusting a light direction of the UAV according the optical axis direction of the binocular camera assembly detected in real time, to perform the autonomous orbiting centered on the orbited object.

12. The UAV according to claim 11, wherein the processor is further configured to:

obtain a moving direction of the orbited object in real time; and that the processor maintains the target flying height and the target spatial distance unchanged, and adjusts a flight direction of the UAV according to the optical axis direction of the binocular camera assembly detected in real time further comprises:

maintaining the target flying height and the target spatial distance unchanged, and adjusting a flight direction of the UAV according to the moving direction of the orbited object obtained in real time and the optical axis direction of the binocular camera assembly detected in real time.

13. The UAV according to claim 11, wherein the processor is further configured to:

determine a shooting mode for the orbited object; and
perform autonomous orbiting with reference to the shooting mode, the flying height, the spatial distance and the optical axis direction of the binocular camera assembly detected in real time.

14. The UAV according to claim 13, wherein the processor is further configured to:

use the flying height as an initial flying height;
use the spatial distance as an initial spatial distance between the UAV and the orbited object;

determine a target flying height of the UAV and a target spatial distance between the UAV and the orbited object in each shooting time period according to the shooting mode, the initial flying height and the initial spatial distance; and fly in the each shooting time period according to the target flying height and the target spatial distance, and adjust a flight direction of the UAV according to the optical axis direction of the binocular camera assembly detected in real time, to perform autonomous orbiting centered on the orbited object.

* * * * *